United States Patent [19]

Raj et al.

[11] Patent Number: 4,797,013

[45] Date of Patent: Jan. 10, 1989

[54] COMPACT FERROFLUIDIC ELECTRICALLY CONDUCTING SEALED BEARING

[75] Inventors: Kuldip Raj, Merrimack; Hanumaiah L. Gowda, Hudson; Ronald Moskowitz, Hollis, all of N.H.

[73] Assignee: Ferrofluidics Corporation, Nashua, N.H.

[21] Appl. No.: 12,193

[22] Filed: Feb. 9, 1987

[51] Int. Cl.⁴ .............................................. F16C 33/82
[52] U.S. Cl. .................................... 384/462; 384/478; 384/446; 277/80
[58] Field of Search ................ 384/446, 478, 133, 488, 384/462; 277/80

[56] References Cited

U.S. PATENT DOCUMENTS

| | | | |
|---|---|---|---|
| 3,620,584 | 11/1971 | Rosensweig. | |
| 3,977,739 | 8/1976 | Moskowitz et al. | |
| 4,043,616 | 8/1977 | Zimmer. | |
| 4,293,137 | 10/1981 | Ezekiel | 277/80 |
| 4,407,508 | 10/1983 | Raj et al. | 277/1 |
| 4,506,895 | 3/1985 | Raj | 277/1 |
| 4,531,846 | 7/1985 | Raj | 384/478 |
| 4,604,222 | 8/1986 | Borduz et al. | 252/62.52 |
| 4,604,229 | 8/1986 | Raj et al. | 252/510 |
| 4,628,384 | 12/1986 | Raj et al. | 360/97 |
| 4,630,943 | 12/1986 | Stahl et al. | 384/446 |

Primary Examiner—Lenard A. Footland
Attorney, Agent, or Firm—Wolf, Greenfield & Sacks

[57] ABSTRACT

A sealed, rolling element bearing includes an inner race attached to a shaft, an outer race attached to a housing, a plurality of rolling elements in an annular region and a pair of shields extending inwardly from the outer race toward the inner race so as to substantially enclose the annular region. The shields have a closely-spaced, non-contacting relationship with the inner race thereby defining gaps. The elements of the bearing are of magnetically permeable material, and the sealed bearing includes means for producing a magnetic field in the gaps and in the regions where the rolling elements contact the races. A ferrofluid is retained by the magnetic field in the gaps for sealing and in the regions of contact between the rolling elements and the races for lubrication. A reservoir of ferrofluid in the regions between the two seals replenishes ferrofluid lost at the sealing and lubrication areas. The magnetic field can be produced by permanent magnetization of the bearing assembly or by axially polarized permanent magnets located on either or both ends of the outer race. Such a bearing may be used with a magnetic or nonmagnetic shaft and permits relative motion between the shaft and the housing. The housing material is of nonmagnetic type when external magnets are used.

9 Claims, 4 Drawing Sheets

COMPACT FERROFLUIDIC ELECTRICALLY CONDUCTING SEALED BEARING

FIELD OF THE INVENTION

This invention relates to rolling element bearings and, more particularly, to compact rolling element bearings sealed with a ferrofluid and utilizing a ferrofluid for lubrication.

BACKGROUND OF THE INVENTION

Bearing assemblies are employed to permit sliding or rotating movement between parts with a minimum of friction. For example, ball or roller bearing assemblies are used to support the drive shaft, or spindle, of a computer magnetic disk drive. In modern disk drive assemblies, the mechanical clearance between the surface of the magnetic disk which stores data and the read/write head which transfers data to and from the disk is extremely small, i.e., about 10 microinches. Any particulate contamination on the disk surface or in the region of the read/write head is likely to cause a malfunction of the assembly. Consequently, the computer disk and the head must be enclosed and must be protected against contamination from the outside environment. The motor, which drives the disk shaft, and the bearings which support the disk shaft are a source of contamination due to their mechanically movable parts. However, it is generally inconvenient to enclose the motor. Thus, a ferrofluid exclusion seal is typically employed on the drive shaft to prevent contaminants from the motor and the bearings and from the external environment from reaching the interior of the disk assembly along the drive shaft.

The trend toward miniaturization of disk drives has required thinner and thinner drives, thereby severely limiting the axial space available for magnetic fluid seals and requiring seal designs with a very small axial length, or thickness. Magnetic seals for use in small disk assemblies, such as 5¼ inch and 3½ inch spindles, are typically required to have an axial thickness on the order of 1.3 mm, while disk shaft bearings are typically required to have an axial thickness on the order of 5 mm.

Various bearing assemblies and separate ferrofluid seals have been disclosed in the prior art to perform the exclusion function. Multiple stage seals have been employed in conjunction with ball bearings to support a shaft as disclosed in U.S. Pat. No. 3,620,584, issued Nov. 16, 1971 to Rosensweig. The separate prior art seal and bearing assemblies do not meet the seal thickness requirements of present disk drives.

It is known in the prior art to utilize a magnetic fluid as the lubricant in ball bearing assemblies. Ball bearing assemblies utilizing magnetic balls to retain a ferrofluid lubricant in place have been disclosed in U.S. Pat. No. 3,977,739, issued Aug. 31, 1976 to Moskowitz et al. The ferrofluid is retained by a magnetic field in the regions where the bearing balls contact the bearing races. As a result, the bearing runs cooler and its life is extended. However, any leakage of the ferrofluid from the bearing is a source of contamination to the sealed disk head assembly and reduces the bearing effectiveness. A bearing having a magnetic fluid as a lubricant and utilizing seals on each end is disclosed in U.S. Pat. No. 4,043,616, issued Aug. 23, 1977 to Zimmer. Annular magnets, attached to the housing or to the shaft at each end of the bearing, define gaps in which a sealing magnetic fluid is retained. The Zimmer configuration is not suitable for use in applications requiring a small axial thickness, such as the disk drive assembly described above. Each annular magnet has an axial dimension on the same order as the ball bearing. Reduction of the axial thickness of the magnets to thicknesses on the order of 1 millimeter would reduce the magnetic field below the level which is required for holding the magnetic fluid in the gaps. Furthermore, the magnets are separated by spacers from the bearing, which increases the overall axial length of the sealed bearing. A radially polarized magnet has been positioned between the races of a bearing to provide an exclusion seal in U.S. Pat. No. 4,531,846, issued July 30, 1985 to Raj. However, the Raj patent does not disclose sealing of the bearing and is not compatible with achieving a small axial thickness since a reduction in magnet thickness would reduce the magnetic field below the level required for holding the magnetic fluid.

It is a general object of the present invention to provide improved bearing assemblies.

It is another object of the present invention to provide rolling element bearing assemblies which are both sealed and lubricated with a magnetic fluid.

It is yet another object of the present invention to provide rolling element bearing assemblies which are electrically conductive.

It is still another object of the present invention to provide sealed bearing assemblies with a minimum axial dimension.

It is a further object of the present invention to provide bearing assemblies sealed with ferromagnetic fluid wherein a magnetically permeable shaft is not required.

It is a further object of the present invention to provide sealed rolling element bearing assemblies which are easily manufactured and which are low in cost.

SUMMARY OF THE INVENTION

According to the present invention, these and other objects and advantages are achieved in a sealed rolling element bearing comprising an inner race attachable to a shaft, an outer race concentric with the inner race and attachable to a housing, a plurality of rolling elements located in an annular region between the inner race and the outer race, and a pair of thin shields extending inwardly from the outer race toward the inner race on opposite sides of the rolling elements so as to substantially enclose the annular region. The shields have a closely-spaced, noncontacting relationship with the inner race thereby defining a gap between each of the shields and the inner race. The inner race, the outer race, the rolling elements and the shields are of magnetically permeable material. The sealed bearing further includes magnetic means for producing a magnetic field in the gaps and in the regions where the rolling elements contact the inner race and the outer race, and a ferrofluid retained by the magnetic field in the gaps between the shields and the inner race and in the regions where the rolling elements contact the inner race and the outer race. The ferrofluid permits relative rotary movement of the housing and the shaft while sealing opposite ends of the bearing and lubricating the rolling elements. The thin shields permit the bearing to be sealed with little or no added axial length since the magnetic field is channeled into the gaps where sealing occurs.

In an alternative embodiment, the shields are attached to the inner race and extend outwardly so as to form gaps between outer edges of the shields and the outer race. In either embodiment, the shields can be angled inwardly toward the rolling elements or can be straight.

In one preferred embodiment of the invention, the magnetic means comprises one or more of the elements of the bearing being permanently magnetized such that the residual magnetism retains ferrofluid in the gaps and in the regions where the rolling elements contact the inner race and the outer race. Thus, there is provided a sealed bearing lubricated by ferrofluid without adding to the axial length of the bearing.

In another preferred embodiment of the invention, the magnetic means includes an axially magnetized permanent magnet located on one end of the outer race. In still another embodiment, the magnetic means includes axially magnetized permanent magnets located on each end of the outer race. In both of these embodiments the bearing including the outer race, the inner race, the rolling elements and the shield elements act as pole pieces and carry magnetic flux to the gaps and to the regions where the rolling elements contact the inner race and the outer race.

In another feature of the invention, the ferromagnetic fluid retained in the annular region between the inner race and the outer race acts as a reservoir to replenish magnetic fluid lost from the gaps between the shields and the inner race. The ferromagnetic fluid can be electrically conductive, thereby permitting the shaft to be electrically connected to the housing through the sealed bearing.

Brief Description of Drawings

For a better understanding of the present invention, together with other and further objects, advantages and capabilities thereof, reference is made to the accompanying drawings which are incorporated herein by reference and in which.

Detailed Description of the Invention

Figure 1:
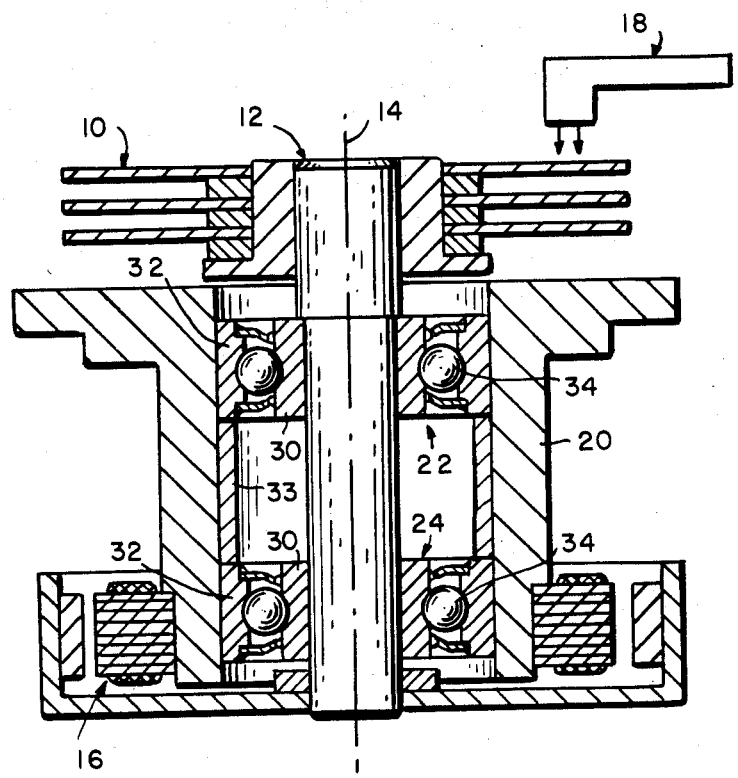
FIG. 1 is a cross-sectional view of a disk drive assembly incorporating a sealed bearing in accordance with the present invention.

A computer disk drive assembly incorporating a sealed bearing in accordance with the present invention is shown in FIG. 1. A magnetic disk(s) 10 is attached at its center to a spindle shaft 12. The shaft 12 and the magnetic disk 10 are caused to rotate about an axis 14 by a motor 16 attached to the shaft 12. Information is transferred to and from the disk 10 by a disk head 18. A housing 20 supports the motor 16 and a pair of bearing assemblies 22, 24 which are spaced along and support the shaft 12. The shaft can be magnetic or nonmagnetic material.

The bearing assemblies 22, 24 each include an inner race 30 rigidly attached to the shaft 12, an outer race 32 rigidly attached to the housing 20, and a plurality of spherical balls 34 located between the inner race 30 and the outer race 32. A spacer 33 or a shoulder at either end determines the spacing between bearing assemblies 22 and 24. Adhesive can be used to retain the bearing assemblies 22, 24 in position. Alternatively, a retaining clip can be used to retain the bearing assemblies 22, 24 in the disk drive assembly. However, the retainer clip adds to the axial dimension of the assembly. It will be understood that the components of the disk drive assembly are not shown to scale in FIG. 1.

Figure 2:
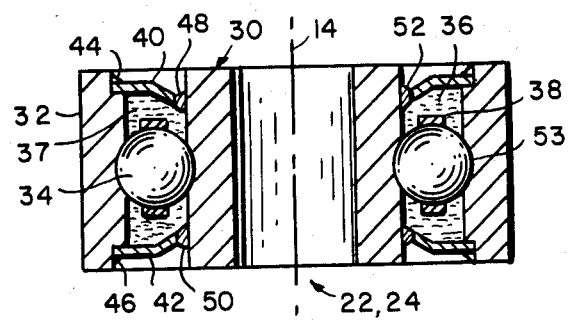
FIG. 2 is a cross-sectional view of the sealed bearing used in the assembly of FIG. 1.

A bearing assembly representative of the bearing assemblies 22, 24 is shown in greater detail in FIG. 2. The inner race 30 and the outer race 32 are concentric with the axis 14 and define an annular region 36 between them. The balls 34 may be retained by a cage 38. Shields 40, 42 are attached to the outer race 32 and extend inwardly toward the inner race 30 on opposite sides of the balls 34 so as to substantially enclose the annular region 36. Each of the shields 40, 42 is a relatively thin ring which is sealed with a fixed seal to the outer race 32. The shields 40, 42 have a typical thickness on the order of 0.5 millimeter. Typically, the outer race 32 is provided with annular notches 44, 46 for retaining the shields 40, 42 without adding to the length of the bearing assembly. The shields 40, 42 extend radially inward so that the inner edge of each is in a closely-spaced, noncontacting relationship with the inner race 30, thereby defining annular gaps 48, 50 between the shields 40, 42 and the inner race 30.

In accordance with the present invention, the inner race 30 the outer race 32, balls 34 and the shields 40, 42 are made of a magnetically permeable material such as magnetically permeable steel, and the bearing assembly includes means for producing a magnetic field in the gaps 48, 50 and in the regions where the balls 34 contact the races 30, 32. In one preferred embodiment, the ball bearing assembly is magnetized in an external magnetic field of about 10,000 oersteds in any orientation. Upon removal of the magnetic field, the bearing retains a residual magnetization which is sufficient to retain a ferrofluid 52 in the annular gaps 48, 50 and in the regions of contact 53 between the balls 34 and the races 30, 32 as well as to contain a reservoir of ferrofluid 37 in the annular region 36.

The ferrofluid 52 in the gaps 48, 50 acts as an exclusion seal between annular region 36 and the external environment and also acts as a seal for the rotating shaft 12. Contaminants are prevented from passing between the annular region 36 and the external environment and also are prevented from passing along the outside of the shaft to the interior of the disk assembly where the magnetic disk 10 is located.

The ferrofluid 52 within the region 36 tends to be attracted to the regions 53 where the balls 34 contact the races 30, 32 because these are the regions of strongest magnetic field. The thin shields 40, 42 concentrate or channel the magnetic field to the gaps 48, 50, respectively, so that there is sufficient magnetic field to retain the ferrofluid 52 with little or no added axial length. Any excess ferrofluid 37 is retained within the region 36 by the seals in the gaps 48, 50. Furthermore, the ferrofluid 37 within the region 36 acts as a reservoir to replenish ferrofluid which may escape from the gaps 48, 50 and the region of contact 53. As a result, the same ferrofluid is used for both sealing and lubrication of the bearing assembly. The two ferrofluidic seals on opposite sides of the bearing protect the interior of the bearing from contaminants as well as prevent contaminants from reaching the disk area. A low viscosity ferrofluid is used for lubrication, thereby improving retention of the lubricant, lowering operating temperature and extending operating life.

The shields 40, 42 are shown in FIG. 2 angled inwardly toward the balls 34 in the region of the gaps 48, 50. The purpose of the angled configuration is to insure that the beads formed by the ferrofluid 52 in the gaps 48, 50 do not extend to the ends of inner race 30. Alternatively, the inner race 30 can have a slightly greater axial length than the outer race 32. In that case, a straight shield may be used.

In a preferred embodiment of the present invention, the ferrofluid 52 and 37 is electrically conductive to provide electrical contact between the shaft 12 and the housing 20 for grounding purposes. Electrically conductive ferrofluids are disclosed in U.S. Pat. Nos. 4,604,222 and 4,604,229 which are incorporated herein by reference. As shown in FIG. 1, the ferrofluid 52 in the gaps 48, 50 of each of the bearing assemblies 22, 24 provides four parallel paths between the shaft 12 and the housing 20, thereby reducing electrical resistance. In addition, electrical paths are provided through the ferrofluid lubricant and balls 34. The disclosed configuration provides reliable, low-resistance grounding of the disk drive shaft 12.

Figure 3:
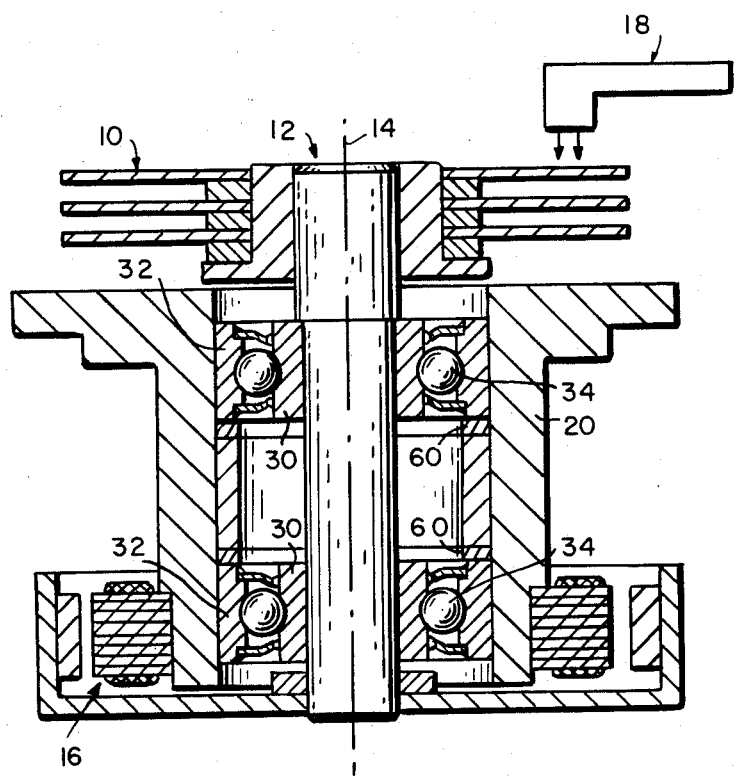
FIG. 3 is a cross-sectional view of a disk drive assembly incorporating a sealed bearing in accordance with another preferred embodiment of the present invention.
Figure 4:
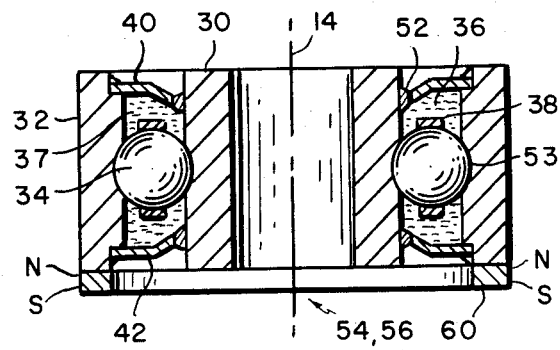
FIG. 4 is a cross-sectional view of the sealed bearing utilized in the assembly of FIG. 3.

Another preferred embodiment of the present invention is shown in FIGS. 3 and 4. Elements designated by the same reference numerals in FIGS. 3 and 4 are the same as the corresponding elements in FIGS. 1 and 2. Bearing assemblies 54, 56 support the shaft 12 and are similar to bearing assemblies 22, 24 described hereinabove, except as follows. The magnetic field in the bearing assemblies 54, 56 is provided by an axially polarized magnet 60 mounted on one end of the outer race 32. In each of the bearing assemblies 54, 56, the magnet 60, which is in the shape of an annular ring concentric with the axis 14, produces a magnetic field that retains ferrofluid in the gaps 48, 50 and also retains ferrofluid in the regions 53 where the balls 34 contact the races 30, 32. In this embodiment, the strength of the magnetic field is increased relative to the embodiment of FIGS. 1 and 2, thereby improving the capability for retaining ferrofluid in the gaps and in the regions 53 for lubrication of the balls 34. The shields 40, 42 act as pole pieces for concentrating the magnetic field produced by the magnets 60 in the gaps 48, 50. When the magnets 60 are located between the bearing assemblies 54, 56 as shown in FIG. 3, the overall length of the assembly is not increased. Each bearing assembly can be viewed as a complex-shaped pole piece for the magnet 60. Excess ferrofluid 37 is retained in the annular region 36 as a reservoir for lubrication and sealing. A nonmagnetic spindle housing is required with the embodiment shown in FIGS. 3 and 4.

Figure 5:
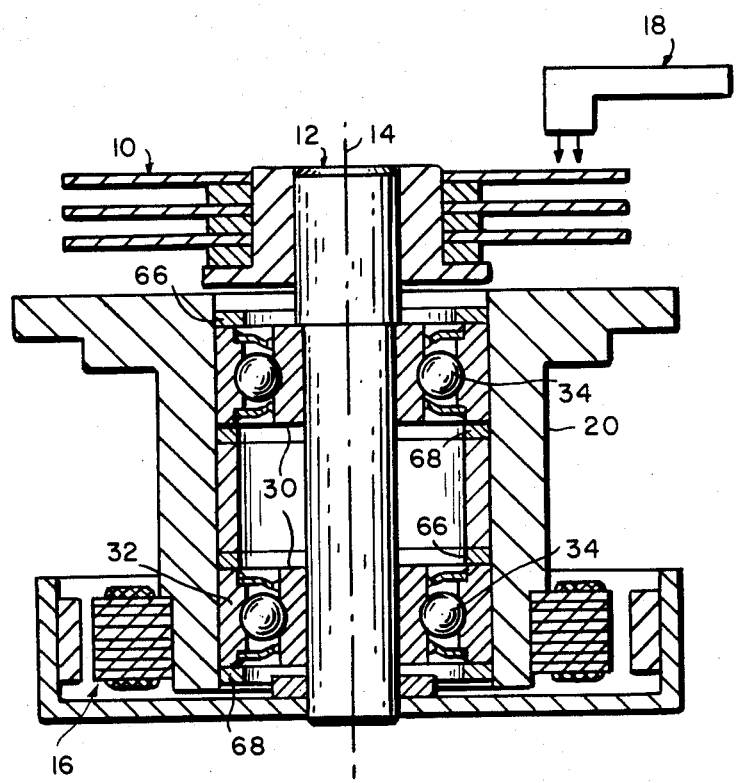
FIG. 5 is a cross-sectional view of a disk drive assembly incorporating a sealed bearing in accordance with another preferred embodiment of the present invention.
Figure 6:
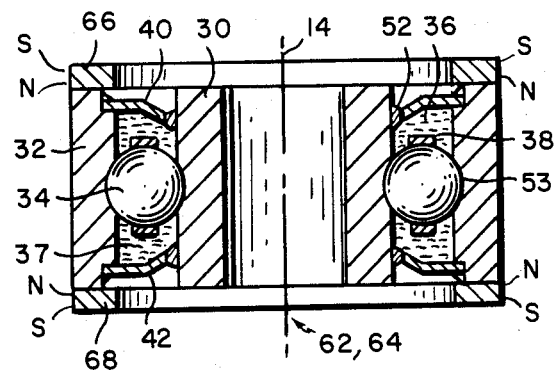
FIG. 6 is a cross-sectional view of the sealed bearing utilized in the assembly of FIG. 5.

Yet another preferred embodiment of the present invention is illustrated in FIGS. 5 and 6. Elements designated by the same reference numerals are the same as those in FIGS. 1 and 2. Bearing assemblies 62, 64 support the shaft 12 and are similar to bearing assemblies 22, 24 described hereinabove, except as follows. Axially polarized magnets 66, 68 located on each end of the outer race 32 provide the magnetic field. Each of the magnets 66, 68 can be an annular ring coaxial with the axis 14 and mounted on the outer race 32 with the same poles facing the outer race 32. This arrangement further strengthens the magnetic field in the bearing assembly and makes it more symmetrical. The shields 40, 42 act as pole pieces for concentrating the magnetic field produced by the magnets 60 in the gaps 48, 50. Thus, the ferrofluid is more reliably retained in the gaps 48, 50 and in the regions 53 where the balls 34 contact the races 30, 32. The disadvantage of this embodiment, as shown in FIG. 5, is that the thickness of two magnets is added to the axial dimension of the overall assembly. The increase in axial length is typically on the order of one millimeter. In the embodiment of FIGS. 5 and 6, the bearing assembly can be viewed as providing a pole piece of complex shape for the magnets 62, 64. A ferrofluid reservoir 37 is created in the annular region 36 which replenishes any loss in fluid in the sealing area of gaps 48, 50 and the lubrication area 53. A nonmagnetic spindle housing is employed for the embodiment shown in FIGS. 5 and 6.

Figure 7:
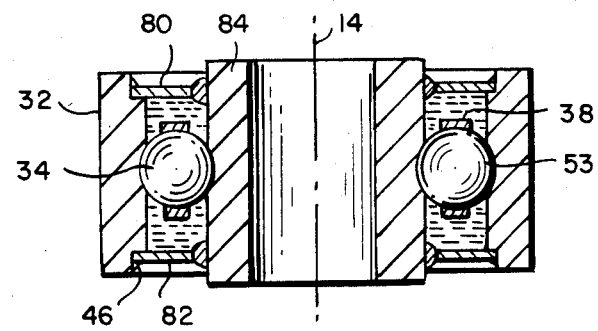
FIG. 7 is a cross-sectional view of a sealed bearing utilizing straight shields.

A sealed bearing having straight shields 80, 82 and an inner race 84 that is slightly longer in the axial direction than the outer race 32, is shown in FIG. 7. The remainder of the bearing is generally the same as the bearing shown in FIG. 2 and described hereinabove.

Figure 8:
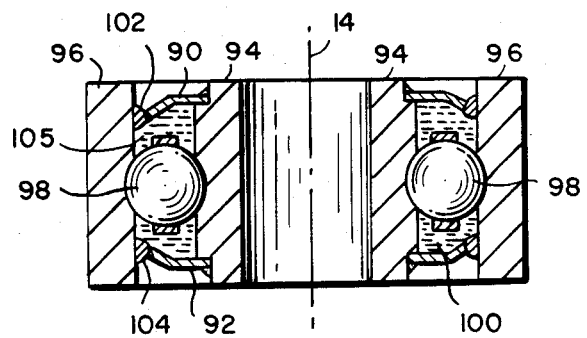
FIG. 8 is a cross-sectional view of a sealed bearing wherein the shields are attached to the inner race.

FIG. 8 shows a sealed bearing having shields 90, 92 which are rigidly attached to an inner race 94 and extend outwardly toward an outer race 96 on opposite sides of balls 98 so as to substantially enclose an annular region 100. The shields 90, 92 have outer edges which are in closely-spaced, noncontacting relationship with the outer race 96, thereby defining annular gaps 102, 104 between the shields 90, 92 and the outer race 96. A ferrofluid is retained in the gaps 102, 104 by a magnetic field which can be produced as described above in connection with FIGS. 1–6. Again, a ferrofluid reservoir 105 is maintained in the annular region 100. The sealed bearing of FIG. 8 has a similar construction to the bearing of FIG. 2 except that the shields are attached to the inner race and the gaps are formed between the shields and the outer race. The sealed bearings shown in FIGS. 7 and 8 can be substituted in the disk drive assemblies of FIGS. 1, 3 and 5, if desired.

The sealed bearing of the present invention is highly advantageous in providing a compact sealed bearing assembly. The embodiments of FIGS. 1–4 provide seals at four locations without adding at all to the axial length of the overall assembly. The embodiment of FIGS. 5 and 6 adds on the order of one millimeter to the assembly. Furthermore, when an electrically conductive ferrofluid is utilized, grounding of the shaft 12 is accomplished with a relatively low resistance connection and without adding the axial length of the assembly. Thus, the bearings are sealed without requiring a separate ferrofluid exclusion seal. Alternatively, separate ferrofluid exclusion seals can be provided to further improve the sealing capability. The invention has been described in connection with ball bearings. However, the present invention can be applied equally well to roller-type bearings. Since the seal is located in the bearing assembly, a magnetically permeable shaft is not required. The sealed bearing may be used both for fixed shaft (rotating housing) and rotating shaft (stationary housing) configurations.

The typical specifications for a compact, electrically conductive sealed bearing are as follows:

| | |
|---|---|
| Ferrofluid type | electrically conducting |
| Resistivity | $10^6$ to $10^8$ ohms-centimeter |
| Saturation magnetization | 200 to 400 gauss |
| Viscosity | 100 to 600 CP at 27° C. |
| Evaporation rate | $10^{-9}$ grams per $cm^2$-seconds at 80° C. |
| Thickness of shield | 0.5 mm |
| Bearing material | magnetically permeable steel |
| Radial gap between shield and inner race | 0.12 mm |
| Pressure capacity of each seal | 100 mm $H_2O$ |
| Axial thickness of magnet | 0.75 mm |
| Energy product of magnet | 1.1 to 10 × $10^6$ g-oe |
| Operating temperature range | −40° C. to +100° C. |

While there has been shown and described what is at present considered the preferred embodiments of the present invention, it will be obvious to those skilled in the art that various changes and modifications may be made therein without departing from the scope of the invention as defined by the appended claims.

What is claimed is:

1. A sealed rolling element bearing for supporting a shaft of magnetic or nonmagnetic material and for permitting rotation of the shaft relative to a housing comprising:
    an inner race attachable to the shaft;
    an outer race concentric with said inner race and attachable to the housing;
    a plurality of rolling elements located in an annular region between said inner race and said outer race;
    a pair of shields extending inwardly from said outer race toward said inner race on opposite sides of said rolling elements so as to substantially enclose said annular region, said shields having a closely-spaced, noncontacting relationship with said inner race thereby defining a gap between each of said shields and said inner race,
    said inner race, said outer race, said rolling elements and said shields being of magnetically permeable material;
    magnetic means for producing a magnetic field in said gaps and in regions where said rolling elements contact said inner race and said outer race; and
    a ferrofluid retained by said magnetic field in the gaps between said shields and said inner race and in the regions where said rolling elements contact said races, said ferrofluid permitting relative rotary movement of said housing and said shaft while sealing opposite ends of said bearing and lubricating said rolling elements; and wherein at least a portion of each of said shields is angled toward said rolling elements and said inner and outer races have equal axial dimensions.

2. A sealed bearing as defined in claim 1 wherein said magnetic means comprises one or more of said inner race, said outer race, said rolling elements and said shields being magnetized such that residual magnetism produces said magnetic field.

3. A sealed bearing as defined in claim 1 wherein said ferrofluid is electrically conducting to permit electrical connection between said inner race and said outer race through said ferrofluid and said shields and through said ferrofluid and said rolling elements.

4. A sealed bearing as defined in claim 1 wherein the annular region between said outer race and said inner race is substantially enclosed by said shields and contains a ferrofluid reservoir which lubricates said bearing and which replenishes ferrofluid in said gaps.

5. A sealed bearing as defined in claim 1 wherein said magnetic means includes an axially magnetized permanent magnet mounted on one end of said outer race and said housing is nonmagnetic.

6. A sealed bearing as defined in claim 5 wherein said permanent magnet is an annular ring coaxial with said outer race.

7. A sealed bearing as defined in claim 1 wherein said magnetic means includes axially magnetized permanent magnets mounted on each end of said outer race and said housing is nonmagnetic.

8. A sealed bearing as defined in claim 7 wherein said permanent magnets are annular rings coaxial with said outer race.

9. Apparatus for rotation of a load about an axis comprising:
    a shaft of magnetic or nonmagnetic material aligned with the axis and coupled to the load;
    a housing including means for rotating said shaft about the axis relative to said housing; and
    a pair of rolling element bearings of magnetically permeable material axially spaced along said shaft to permit rotation of said shaft relative to said housing, each rolling element bearing comprising
    an inner race attached to said shaft;
    an outer race concentric with said inner race and attached to said housing;
    a plurality of rolling elements located in an annular region between said inner race and said outer race,
    a pair of shields extending inwardly from said outer race toward said inner race on opposite sides of said rolling elements so as to substantially enclose said annular region, said shields having a closely-spaced, noncontacting relationship with said inner race, thereby defining a gap between each of said shields and said inner race,
    magnetic means for producing a magnetic field in said gaps and in regions where said rolling elements contact said inner race and said outer race, and
    a ferrofluid retained by said magnetic field in the gaps between said shields and said inner race and in the regions where said rolling elements contact said races, said ferrofluid permitting relative rotary movement of said housing and said shaft while sealing opposite ends of said bearing and lubricating said rolling elements, and creating a reservoir for continuous replenishment and wherein at least a portion of each of said shields is angled toward said rolling elements and said inner and outer races have equal axial dimensions.

* * * * *